Patented Nov. 25, 1930

1,782,591

UNITED STATES PATENT OFFICE

RUDOLF WIETZEL, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF ALKYL FORMATES

No Drawing. Application filed February 9, 1926, Serial No. 87,170, and in Germany February 13, 1925.

It is known that alkyl formates may be obtained by the action of carbon monoxid under pressure with alcohols in the presence of catalysts.

I have now found that it is not necessary to employ for this process pure carbon monoxid for the production of which large plants are required, but that alkyl formates may also be obtained with excellent yields by the action of water gas or similar gases containing carbon monoxid and substantial amounts of other gases especially hydrogen which mixtures can be cheaply prepared on an industrial scale. The presence of hydrogen has the special advantage that even the slightest traces of impurities present in the gas mixture and injurious to the reaction are thereby removed. By the expression "inert gases" I mean such gases as do not participate in the reaction proper, but which may, however, be capable of furthering it; they may react with the impurities thus preventing undesirable by-reactions. These gases are preferably purified as far as possible from moisture and carbon dioxid, also from sulfuretted hydrogen and other sulfur compounds and also from iron carbonyl prior to their action on the alcohol.

The gases containing the carbon monoxid may be forced into a high pressure vessel containing a liquid aliphatic alcohol in which case the inert gases are removed from the high pressure vessel at intervals in order to avoid too large quantities of them accumulating in the autoclave, or still better they may be passed through the alcohol under pressure. According to the speed of the gas current, the temperature, the pressure and the quantity of the catalyst, if such be added, more or less carbon monoxid is taken up.

The speed of the reaction can be increased and the reaction itself performed more smoothly by bringing the gas into as intimate a contact with the alcohol as possible, since by a protracted stay of the reaction liquid in the high pressure vessel certain by-products, among which are probably aldehydes, which are injurious to the desired reaction would be formed. The intimate contact of the gases with the alcohol may be effected for example by introducing them into the liquid through a large number of very fine openings in order to produce minute bubbles from which the carbon monoxid is absorbed at once. Or, the autoclave may be provided with a suitable mixing device by which the liquid is continuously sprayed into the gases within the autoclave which method is especially applicable if the gases are introduced into the vessel above the surface of the liquid, or the alcohol may be introduced in the form of a mist by means of fine nozzles into the reaction vessel filled with the gases containing carbon monoxid under pressure. When working continuously, the vessel capable of withstanding the pressure may contain a number of perforated shelves, or trays, similar to a distillation column, into which the alcohol is fed at the top while the gases containing carbon monoxid are introduced in a compressed state near the bottom. The speed of the two countercurrents should be so controlled that the alkyl formate formed can be continuously withdrawn at the bottom while the inert gases, or a gas with a reduced percentage of carbon monoxid escapes at the top of the vessel.

In order to avoid considerable quantities of the reaction liquor being carried away with the gas current, the waste gases should be cooled before releasing the pressure so that the alcohol and formate are condensed and run back into the reaction vessel. By employing liquid or solid absorption agents as for example formamid, active charcoal, silica gel, or the like, the losses may be further reduced or even totally avoided. The alcohols and formates retained in the absorption agents can be recovered in a very convenient manner by intercalating the absorption tower before the high pressure reaction vessels after the absorption mass has been saturated, so that the fresh gases which are preferably in a preheated condition pass through the tower expelling thereby the absorbed substances and again introducing them into the reaction vessel.

Several high pressure reaction vessels may be employed in series and the gases containing carbon monoxid pass through them so that the percentage of carbon monoxid is gradually decreased. Preferably, the vessel in which the gases have reacted on the alcohol for the longest time and in which the reaction consequently has proceeded farthest, is exposed to the fresh gas and the vessel freshly filled with alcohol arranged last. By this manner of working the carbon monoxid is utilized to the utmost extent. When working continuously, several vessels may be arranged one above the other and the alcohol forced in at the upper end and the gases containing carbon monoxid from below, so that they meet in a countercurrent while the gases poor in carbon monoxid are continuously withdrawn at the top and the alkyl formate at the lower end. In a similar manner a wormlike pipe capable of resisting the pressure may be used, in which the gases ascend and the liquid descends.

Also when working continuously, the carbon monoxid may be brought into an intimate contact with the alcohol, for example by employing a pressure vessel provided with a number of shelves or trays similar to a distillation column. The alcohol and the catalyst are introduced at the upper end and the gases containing carbon monoxid are forced in below. The alkyl formate can be removed below and at the upper end the inert gases which may still contain carbon monoxid, can escape.

The continuous performance of the process may also be carried out by again introducing the gases containing carbon monoxid after leaving the apparatus into the alcohol.

Generally it is advantageous to work at a moderately elevated temperature, but the reaction proceeds also at ordinary temperature with sufficient speed if the gas is brought into an intimate contact with the liquor. Generally also the presence of catalysts, especially metal alcoholates, is very helpful, but the reaction also goes on in the absence of a catalyst, though with a lower speed, provided the alcohol and the gases containing carbon monoxid are completely pure, especially free of water, and if for the walls of the reaction vessel materials such for example as tin or enamel, are used which do not cause any decomposition of the alcohols, as dehydrogenation to aldehydes or dehydration to ethers. Copper, iron, and nickel for example are not suitable for use in the reaction vessel.

The reaction may be carried out with methanol, ethyl alcohol whether pure or denatured, propyl or butyl alcohols and the like.

The process above described may be advantageously combined with other reactions in which the carbon monoxid contained in industrial gases as for instance water gas or producer gas is an undesirable or injurious admixture; for example water gas freed from carbon dioxid and containing about 40 per cent of carbon monoxid is treated with alcohols in the manner described to produce alkyl formates until a residual gas containing only 20 per cent of carbon monoxid is obtained, which is then passed, without releasing the pressure, at a more elevated temperature over a suitable contact mass in order to produce synthetic methanol. In case the carbon monoxid must be totally removed for example for the synthesis of ammonia or the catalytic hydrogenation of organic compounds, the bulk of the carbon monoxid may be removed from the gas by the described method, whereupon the small remainder of it is removed for example by absorption with cuprous salt solutions and the residual gas is utilized for the said purpose, if required after adding other gases as for example nitrogen. The absorption of the carbon monoxid by means of alcohols has the further advantage of being accompanied by a purification of the gases from impurities as for example iron carbonyl, sulphur compounds and the like. However such impurities are better removed from the outset.

My invention will be further illustrated by the following examples to which, however, the invention is not limited.

Example 1

Water gas is completely freed from carbon dioxid and sulphuretted hydrogen by washing under pressure first with water and subsequently with caustic soda solution or aqueous ammonia. The purified gas containing about 45 per cent of carbon monoxid is passed through water-free methanol under a pressure of about 200 atmospheres in order to remove all moisture and then through two high pressure vessels arranged in series and heated to 70 degrees centigrade which vessels are supplied with methanol containing 5 grammes of dissolved sodium metal in each litre. After about 4 hours in the first autoclave 95 per cent, and in the second one about 60 per cent of the alcohol are transformed into methyl formate. The first autoclave is emptied and filled afresh with methyl alcohol containing dissolved sodium. The gas is now passed first through the second high pressure vessel and then through the newly filled one. In the course of 2 hours the content of the second autoclave is practically completely transformed. The waste gases are freed from any vapors of the liquid carried away by cooling and absorption with suitable media and may then be utilized without any further treatment for example for the catalytic manufacture of methanol.

Example 2

A high pressure vessel lined with copper and provided near the bottom with a spiral pipe with numerous very fine perforations is supplied with methanol containing ½ per cent of dissolved sodium metal. Purified producer gas is introduced through the pipe under a pressure of 70 atmospheres into the liquid which is heated to 70 degrees centigrade, which temperature is maintained for 2 hours. Thereafter, nearly 100 per cent of the alcohol is transformed into methyl formate.

*Example 3*

Purified water gas is caused to react on normal butyl alcohol in the manner described in Example 2. In the course of 1 to 2 hours a nearly quantitative conversion is effected by introducing the gas into the liquid.

*Example 4*

Purified water gas is forced into methanol containing 2 per cent of dissolved sodium metal under a pressure of 200 atmospheres at ordinary temperature through a false bottom consisting of a sieve-plate arranged near the bottom of the vessel and provided with a great number of minute perforations. In the course of 8 hours about 90 per cent of the methanol is transformed into methyl formate.

What I claim is:

1. The process of manufacturing alkyl formates which comprises acting on a liquid aliphatic alcohol with a gas comprising carbon monoxid and a substantial amount of an inert gas selected from the group consisting of hydrogen and nitrogen.

2. The process of manufacturing alkyl formates, which comprises acting on a liquid aliphatic alcohol with a gas comprising carbon monoxid and a substantial amount of hydrogen at an elevated temperature.

3. The process of manufacturing alkyl formates which comprises acting with a gas comprising carbon monoxid and a substantial amount of hydrogen at an elevated pressure on a liquid aliphatic alcohol in the presence of a metal alcoholate.

4. The process of manufacturing alkyl formates which comprises acting with a gas comprising carbon monoxid and a substantial amount of hydrogen and freed from components injurious to the reaction on a liquid aliphatic alcohol at an elevated pressure.

In testimony whereof I have hereunto set my hand.

RUDOLF WIETZEL.